United States Patent
Purreiter

(10) Patent No.: US 12,123,474 B2
(45) Date of Patent: Oct. 22, 2024

(54) ELASTOMER BEARING FOR ATTACHING AN ASSEMBLY IN A VEHICLE

(71) Applicant: Bayerische Motoren Werke Aktiengesellschaft, Munich (DE)

(72) Inventor: Christoph Purreiter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 633 days.

(21) Appl. No.: 17/285,140

(22) PCT Filed: Nov. 21, 2019

(86) PCT No.: PCT/EP2019/082043
§ 371 (c)(1),
(2) Date: Apr. 14, 2021

(87) PCT Pub. No.: WO2020/126284
PCT Pub. Date: Jun. 25, 2020

(65) Prior Publication Data
US 2021/0356014 A1 Nov. 18, 2021

(30) Foreign Application Priority Data
Dec. 17, 2018 (DE) ................. 10 2018 132 558.4

(51) Int. Cl.
*F16F 1/38* (2006.01)
*B60K 5/12* (2006.01)
(Continued)

(52) U.S. Cl.
CPC .......... *F16F 7/1028* (2013.01); *B60K 5/1291* (2013.01); *F16F 1/3828* (2013.01); *B60K 5/1208* (2013.01); *F16F 3/093* (2013.01)

(58) Field of Classification Search
CPC ...... F16F 1/3828; F16F 3/093; F16F 13/1409; F16F 13/1481; B60K 5/1208; B60K 5/1291
See application file for complete search history.

(56) References Cited

U.S. PATENT DOCUMENTS 2,425,567 A * 8/1947 Robinson ............... F16F 1/445
267/141.4
5,123,634 A * 6/1992 Schwerdt ............ F16F 13/1481
267/219

(Continued)

FOREIGN PATENT DOCUMENTS

DE 21 49 872 A 4/1973
DE 199 61 679 A1 7/2001
(Continued)

OTHER PUBLICATIONS

Machine translation EP 1026420. (Year: 2000).*
(Continued)

*Primary Examiner* — Thomas J Williams
(74) *Attorney, Agent, or Firm* — Crowell & Moring LLP

(57) ABSTRACT

An elastomer bearing includes a support block, a carrier, a bearing element, a stop damper, and an elastomer body. The bearing element is attached to the support block. The elastomer body connects the carrier to the bearing element. The support block and the carrier, as viewed in an axial direction of the bearing element, engage with one another with play. The stop damper is arranged in the region of the interface between the support block and the carrier. The stop damper limits a maximum displacement of the support block and the carrier, relative to one another both in a radial direction and in an axial direction.

13 Claims, 3 Drawing Sheets

(51) Int. Cl.
*F16F 3/093* (2006.01)
*F16F 7/10* (2006.01)

(56) References Cited

U.S. PATENT DOCUMENTS

| | | | |
|---|---|---|---|
| 7,182,306 B2 * | 2/2007 | Tsutsumida | B60K 5/1291 |
| | | | 248/609 |
| 2002/0038862 A1 | 4/2002 | Hildebrandt et al. | |
| 2004/0046296 A1 * | 3/2004 | Miyahara | F16F 1/38 |
| | | | 267/140.13 |
| 2011/0056761 A1 | 3/2011 | Weissbecker et al. | |
| 2018/0266513 A1 * | 9/2018 | Abe | B60K 5/1283 |

FOREIGN PATENT DOCUMENTS

| | | |
|---|---|---|
| DE | 100 06 178 A1 | 8/2001 |
| DE | 10 2005 044 232 A1 | 3/2007 |
| DE | 20 2008 003 072 U1 | 6/2008 |
| DE | 10 2011 078 492 A1 | 1/2013 |
| DE | 102019113895 A1 * | 11/2020 |
| EP | 1026420 A1 * | 8/2000 ............ F16F 1/3732 |
| EP | 1 132 244 A2 | 9/2001 |
| GB | 773132 A * | 4/1957 ........... B60K 5/1291 |
| WO | WO 2014/038995 A1 | 3/2014 |

OTHER PUBLICATIONS

International Search Report (PCT/ISA/210) issued in PCT Application No. PCT/EP2019/082043 dated Feb. 7, 2020 with English translation (four (4) pages).

German-language Written Opinion (PCT/ISA/237) issued in PCT Application No. PCT/EP2019/082043 dated Feb. 7, 2020 (six (6) pages).

German-language Search Report issued in German Application No. 10 2018 132 558.4 dated Jul. 22, 2019 with partial English translation (14 pages).

* cited by examiner

ELASTOMER BEARING FOR ATTACHING AN ASSEMBLY IN A VEHICLE

BACKGROUND AND SUMMARY OF THE INVENTION

The embodiments of the invention relate to an elastomer bearing, by means of which an assembly can be attached in a vehicle, for example a motor to an assembly carrier.

A wide variety of different embodiments of elastomer bearings exist. A factor that is common in principle to all of said bearings is that at least one elastomer body is arranged between two components such that said components can be displaced relative to one another within certain limits and, as a result, are vibrationally decoupled.

Some of the requirements placed on elastomer bearings lead to conflicts of objectives. By way of example, on the one hand, elastomer bearings are intended to be flexible in order to obtain the desired vibration decoupling. On the other hand, they are intended to reliably support the attached assembly in the case of special events or even a crash, with the result that the acting loads are not intensified by the movement clearance that the elastomer bearing provides.

One object of the invention consists in providing an elastomer bearing which satisfies these requirements.

In order to achieve this object, provision is made according to the invention for an elastomer bearing with a support block, a carrier, a bearing element which is attached to the support block, and an elastomer body which connects the carrier to the bearing element, wherein the support block and the carrier, as viewed in an axial direction of the bearing element, engage in one another with play, wherein a stop damper is provided, which is arranged in the region of the interface between the support block and the carrier and limits a maximum displacement of the two components, support block and carrier, relative to one another both in a radial direction and in an axial direction. The embodiments of the invention are based on the concept of providing the stop damper in addition to the elastomer body, said stop damper being arranged in a targeted manner such that it limits the maximum displacement of the support block relative to the carrier in the case of a special event or crash. The loads which occur can thus likewise be limited.

The radial overlap between the support block and the carrier can be obtained in that a cylindrical structure, which projects into the carrier, is provided on the support block. This cylindrical structure surrounds for example a retaining portion, in which the bearing element is received in the support block.

The cylindrical structure can be configured in one piece with the support block in order to reduce the mounting effort.

Provision can also be made for the cylindrical structure to be a bearing bushing which engages in the support block. The bearing bushing can then be connected to the bearing element by way of an intermediate ring made of elastomer material.

Depending on the requirements, the stop damper can be arranged either on the support block, in particular on the cylindrical structure, or it can be arranged on the carrier.

According to an embodiment, provision is made for the stop damper to be configured in one piece with the elastomer body. This also reduces the mounting effort.

The stop damper can also be attached to a retaining ring, and therefore said stop damper can be assembled as a separate component.

Preferably, the stop damper has a sleeve-shaped portion, which serves as a radial stop damper, and a collar, which serves as an axial stop damper. This ensures that the maximum displacement of the support body relative to the carrier is limited by a soft stop both in the axial direction and in the radial direction.

The bearing element can have a support-block-side portion and a carrier-side portion which are screwed to one another. This makes the mounting easier since the support block can be premounted on the assembly and the carrier can be premounted on the vehicle and, during the mounting of the assembly in the vehicle, only the two portions of the bearing element have to be screwed to one another.

As an alternative, provision can also be made for the bearing element to be of continuous design, such that the entire elastomer bearing is premounted either on the assembly side or on the vehicle side and, during the mounting of the assembly in the vehicle, either the support block or the carrier is fastened to the assembly or vehicle.

The bearing element is preferably mounted in a bearing bushing by means of an elastomer bushing, such that dual decoupling is obtained. In this case, the elastomer body and the elastomer bushing can be designed to decouple at different excitation frequencies.

The elastomer body, as viewed in cross section along the center axis of the bearing element, can have an X geometry, such that a good supporting action is obtained in the case of loads which seek to displace the support block relative to the carrier in the axial direction.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
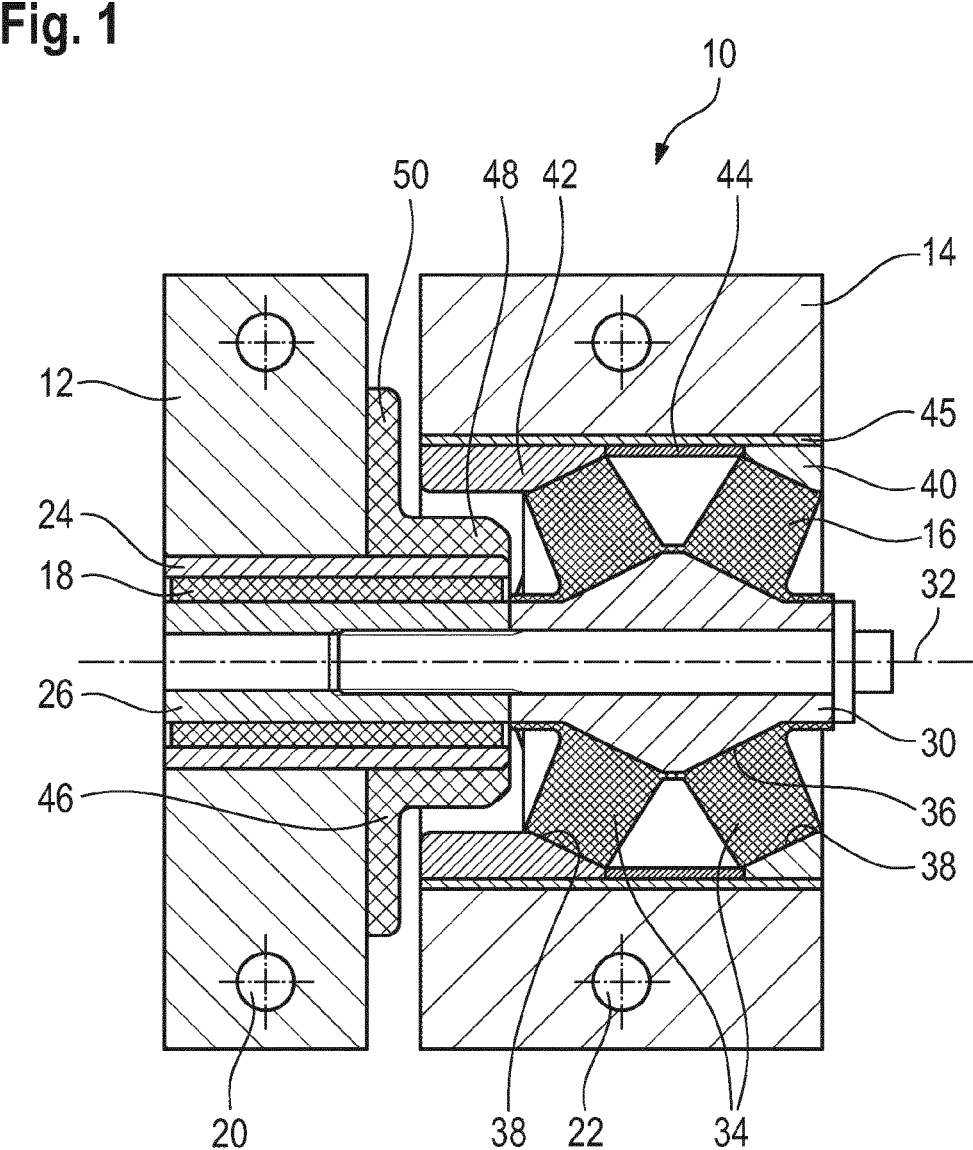
FIG. 1 is a cross section through an elastomer bearing.

FIG. 1 shows an elastomer bearing 10 having a support block 12 and a carrier 14 which are vibrationally decoupled from one another by an elastomer body 16 and an elastomer bushing 18.

The elastomer bearing 10 can be used in particular to connect one component to another component in a vehicle, for example to mount an assembly such as a motor in an assembly carrier or a chassis frame on the vehicle body.

By way of example, the support block can be attached, for example screwed (see the schematically indicated screw holes 20), on the assembly side, whereas the carrier 14 is fastened on the vehicle side (see the schematically indicated screw holes 22). In principle, the support block 12 and the carrier 14 can also be assigned in an inverse manner.

A bearing bushing 24, within which the elastomer bushing 18 is arranged, is inserted into the support block 12. The elastomer bushing surrounds a support-block-side portion 26 of a bearing element 28.

The elastomer bushing 18 can be vulcanized onto the outer surface of the support-block-side portion 26 of the bearing element 28 and the inner surface of the bearing bushing 24.

The bearing element 28 also has a carrier-side portion 30, on which the elastomer body 16 is attached. The carrier-side portion 30 of the bearing element 28 is screwed to the support-block-side portion 26 (see the screw 32).

The elastomer body 16, in section, has an X shape, that is to say has two elastomer rings 34 which are oriented in the manner of disk springs whose inner edges have a smaller distance from one another than the outer edges.

Radial free spaces can also be provided within the elastomer rings 34, such that the elastomer rings 34 are embodied in the manner of spokes.

The two elastomer rings 34 of the elastomer body 16 are arranged, on the inner side, on conical surfaces 36 and are supported, on the outer side, on oblique surfaces 38. The conical surfaces 36 are configured in one piece with the carrier-side portion 30 of the bearing element 28.

The oblique surfaces 38 are arranged on two supporting rings 40, 42, wherein the supporting ring 40, as viewed in the axial direction, has approximately the width of the outer end of the elastomer ring 34, whereas the ring 42 is designed to be significantly wider such that it extends, on the side of the support block 12, to a significant extent beyond the elastomer body 16. A spacer 44 is arranged between the two supporting rings 40, 42.

Here, the supporting rings 40, 42 and the spacer 44 are mounted in a bearing housing 45 which is inserted into the carrier 14. However, it is also possible to dispense with the bearing housing and attach the components directly in the carrier 14.

The two elastomer rings 34 of the elastomer body 16 are configured in one piece with one another here; a material web which connects the two rings to one another can be seen.

The elastomer body 16 is arranged eccentrically in the carrier 14, and is specifically displaced such that it is located on the side which faces away from the support block 12 and there is still an axial free space within the carrier 14. Projecting as cylindrical structure into this free space is the bearing bushing 24 which projects beyond the carrier-side outer surface of the support block. The bearing bushing 24 thus engages in the carrier 14 with play. Expressed differently, there is an overlap between the support block 12 (more specifically the bearing bushing 24 attached to the support block 12) and the carrier 14 in the radial direction.

On that part of the bearing bushing 24 which protrudes beyond the support block 12, there is arranged a stop damper 46 which has a sleeve-shaped portion 48 and a collar 50. The stop damper is formed from elastomer material and is used to limit the maximum relative movement between the support block 12 and the carrier 14. Specifically, the sleeve-shaped portion 48 is used to limit a movement in the radial direction, whereas the collar 50 is used to limit the maximum movement in the axial direction, in which the distance between the support block 12 and the carrier 14 is reduced.

The sleeve-shaped portion 48 lies within the region of the ring 42 which projects beyond the elastomer body 16 in the axial direction. The stop damper thus acts in the radial direction as soon as the free space between the outer surface of the sleeve-shaped portion 48 and the cylindrical inner surface of the ring 42 is exhausted.

In the axial direction, the stop damper 46 acts as soon as the distance between the support-block-side outer surface of the collar 50 and the opposite outer surface of the support block is exhausted.

The stop damper 46 can be vulcanized onto the bearing bushing 24.

By means of the elastomer body 16 and the elastomer bushing 18, the support block 12 and the carrier 14 are vibrationally decoupled from one another, wherein the elastomer body 16 can be matched with different vibration excitations than the elastomer bushing 18. In this case, suitable selection of the weight of the bearing element 28 makes it possible for the absorber formed by bearing element and elastomer bushing to be matched with a desired frequency, which is absorbed.

Figure 2:
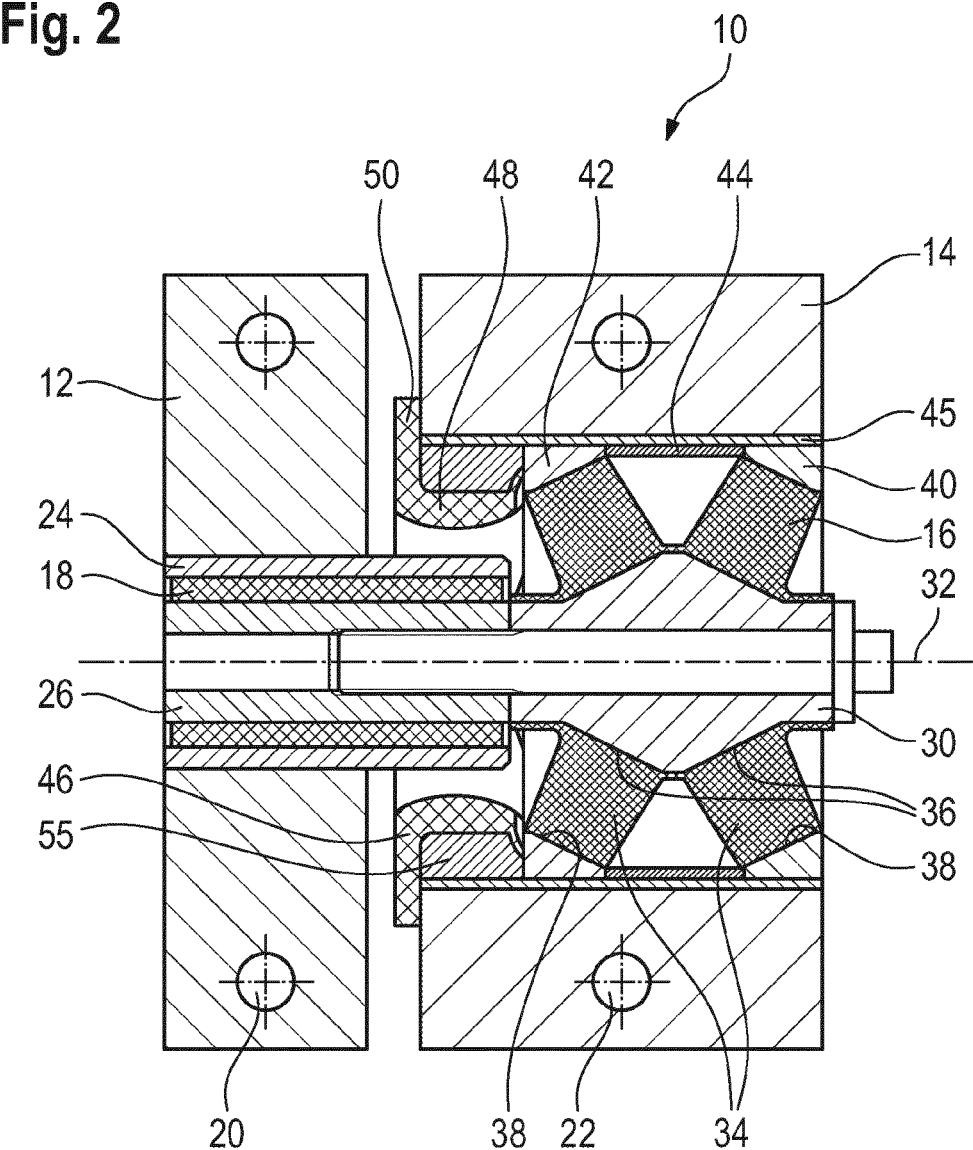
FIG. 2 is a cross section through an elastomer bearing.

A refinement is shown in FIG. 2. The same reference designations are used for the components from the above embodiment, and reference is made to the explanations above in this respect.

The difference between the embodiments is that the stop damper 46 is attached to the carrier 14 in the case of this embodiment.

It is conceivable for the stop damper 46 to be attached to the ring 42. However, in the embodiment shown, the ring 42 is designed to be narrower than in the case of the previous embodiment, such that a retaining ring 55 is attached next to the ring 42, the sleeve-shaped portion 48 of the stop damper 46 being located on the inner surface of said retaining ring. The collar 50 extends along the support-block-side outer surface of the carrier 14.

With regard to the function of the stop damper, there are no differences in relation to the previous embodiment.

Figure 3:
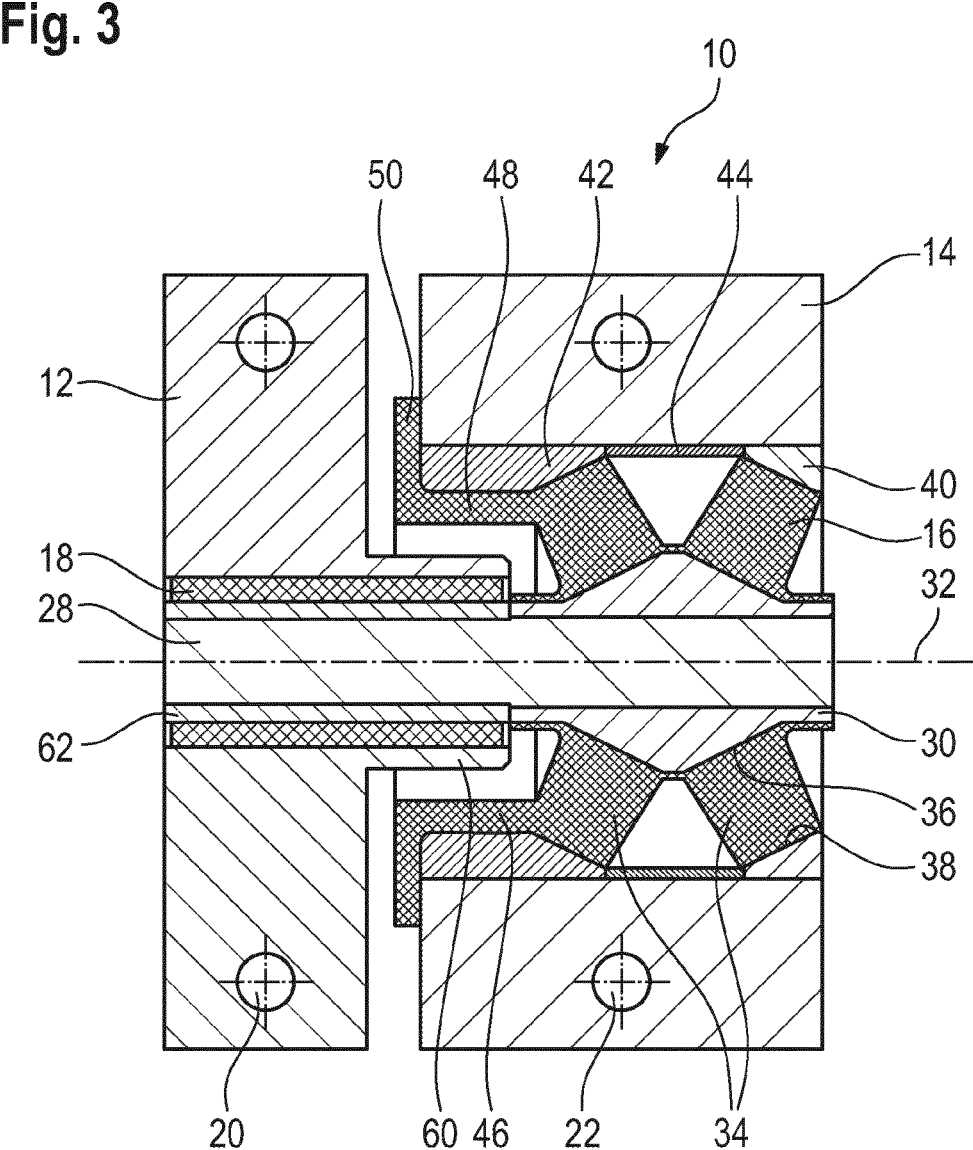
FIG. 3 is a cross section through an elastomer bearing.

Another refinement is shown in FIG. 3. The same reference designations are used for the components from the above embodiment, and reference is made to the explanations above in this respect.

A difference in relation to the previous embodiments is that, in this embodiment, a bearing bushing does not project in the axial direction proceeding from the support block 12 into the carrier 14, but rather the support block 12 is provided with a cylindrical structure 60 in the present embodiment, said cylindrical structure being configured in one piece with said support block and extending into the interior of the carrier 14. The elastomer bushing 18 is arranged within the cylindrical structure 60, said elastomer bushing being connected on the inner side to a bearing bushing 62 here. The bearing element 28 is then mounted within the bearing bushing 62.

A further difference is that the bearing element 28 is of continuous design in the present embodiment.

A yet further difference lies in the configuration of the stop damper. Here, the stop damper is configured in one piece with the elastomer body 16 and extends, proceeding from the outer circumference of the inner elastomer ring 34, with its sleeve-shaped portion 48 along the ring 42, which is configured in the manner discussed above, and then with its collar 50 along the outer surface of the carrier 14.

A factor common to all embodiments is that they have a defined stop system in the radial direction, said stop system being independent of the different relative movements of the elastomer body 16 and the elastomer bushing 18. Furthermore, a compact construction is produced which can also be used in confined installation spaces.

What is claimed is:

1. An elastomer bearing comprising:
   a support block;
   a stop damper;
   a carrier;
   a bearing element which is attached to the support block; and
   an elastomer body which connects the carrier to the bearing element, wherein the support block and the carrier, as viewed in an axial direction of the bearing element, engage with one another with play, the stop damper is arranged in the region of the interface between the support block and the carrier, the stop damper limits a maximum displacement of the support block and the carrier, relative to one another both in a radial direction and in an axial direction, and the bearing element is mounted in a bearing bushing via an elastomer bushing.

2. The elastomer bearing according to claim 1, wherein a cylindrical structure, which projects into the carrier, is provided on the support block.

3. The elastomer bearing according to claim 2, wherein the cylindrical structure is configured integrally in one piece with the support block.

4. The elastomer bearing according to claim 2, wherein the cylindrical structure is the bearing bushing which engages with the support block.

5. The elastomer bearing according to claim 4, wherein the stop damper is arranged on the cylindrical structure.

6. The elastomer bearing according to claim 4, wherein the stop damper is arranged on the carrier.

7. The elastomer bearing according to claim 6, wherein the stop damper is configured integrally in one piece with the elastomer body.

8. The elastomer bearing according to claim 6, wherein the stop damper is attached to a supporting ring.

9. The elastomer bearing according to claim 8, wherein the stop damper has a sleeve-shaped portion, which serves as a radial stop damper, and a collar, which serves as an axial stop damper.

10. The elastomer bearing according to claim 9, wherein the bearing element has a support-block-side portion and a carrier-side portion, which are screwed to one another.

11. The elastomer bearing according to claim 9, wherein the bearing element is formed of a single continuous body.

12. The elastomer bearing according to claim 1, wherein the elastomer body, in cross section along a center axis thereof, defines a shape of an X.

13. The elastomer bearing according to claim 1, wherein the elastomer body defines the stop damper.

* * * * *